United States Patent
Robeson

[19]

[11] Patent Number: 6,053,227

[45] Date of Patent: Apr. 25, 2000

[54] TRACTION DEVICE FOR A WHEELED VEHICLE

[76] Inventor: Palmer Edward Robeson, 1832 Birch Rd., McLean, Va. 22101

[21] Appl. No.: 09/258,898

[22] Filed: Mar. 1, 1999

[51] Int. Cl.[7] .................................................. B60B 15/00
[52] U.S. Cl. ..................... 152/225 R; 152/216; 152/218
[58] Field of Search ........................... 152/213 R, 225 R, 152/226, 217, 218, 216; 301/41.1, 42, 43, 44.1, 45, 46, 51

[56] References Cited

U.S. PATENT DOCUMENTS

| | | | |
|---|---|---|---|
| 1,327,538 | 1/1920 | Etter | 152/218 |
| 2,212,076 | 8/1940 | Rollings | 152/216 |
| 2,343,131 | 2/1944 | Austin | 152/228 |
| 2,397,277 | 3/1946 | Lawrence | 152/218 |
| 2,423,759 | 7/1947 | Edwards | 152/225 |
| 2,434,017 | 1/1948 | Snedeker | 152/213 R |
| 2,453,273 | 11/1948 | Scott | 152/225 R |
| 2,456,544 | 12/1948 | Varner | 152/225 R |
| 2,598,298 | 5/1952 | Pindjak | 152/225 |
| 2,640,522 | 6/1953 | Schroen | 152/228 |
| 2,873,783 | 2/1959 | Higgins | 152/225 R |
| 2,910,105 | 10/1959 | Binegar | 152/225 |
| 2,981,303 | 4/1961 | Hayes | 152/228 |
| 3,019,830 | 2/1962 | Shelby | 152/225 |
| 3,053,302 | 9/1962 | Bopst, III | 152/226 |
| 3,112,784 | 12/1963 | Montenare | 152/216 |
| 3,249,143 | 5/1966 | Scott | 152/225 |
| 3,736,970 | 6/1973 | Clark | 152/226 |
| 3,847,196 | 11/1974 | Gomez | 152/226 |
| 3,891,018 | 6/1975 | Hyggen | 152/225 |
| 4,089,359 | 5/1978 | Jones | 152/218 |
| 4,098,314 | 7/1978 | Welsh | 152/216 |
| 4,122,880 | 10/1978 | Hyggen | 152/216 |
| 4,180,115 | 12/1979 | Yamagishi | 152/225 R |
| 4,209,049 | 6/1980 | Regensburger | 152/216 |
| 4,735,248 | 4/1988 | Cizaire | 152/218 |
| 4,747,438 | 5/1988 | Joung | 152/218 |
| 4,862,936 | 9/1989 | McDonough | 152/216 |
| 4,886,100 | 12/1989 | Parker, III | 152/219 |
| 4,974,653 | 12/1990 | Zelent | 152/216 |
| 5,254,187 | 10/1993 | Metraux | 152/216 |
| 5,513,684 | 5/1996 | Laub | 152/216 |
| 5,735,980 | 4/1998 | Robeson | 152/216 |

FOREIGN PATENT DOCUMENTS 3347566   8/1984   Germany ........................... 152/225 R

*Primary Examiner*—Russell D. Stormer
*Assistant Examiner*—Long Bao Nguyen

[57] ABSTRACT

An emergency traction device is easily and securely fitted on vehicles having tires of different diameters and widths. A single winch sizes and secures the traction device for the proper tire diameter and then for the proper tire width.

20 Claims, 3 Drawing Sheets

TRACTION DEVICE FOR A WHEELED VEHICLE

BACKGROUND OF THE INVENTION a) Field of the Invention

The invention concerns a traction device for vehicles having at least one ground engaging tire. In particular, the invention is directed to an emergency traction device which is readily fitted to tires of various diameters and widths.

b) Description of Related Art

Known traction devices include snow tires, studded tires, and tire chains. The use of snow or studded tires require that the vehicle operator anticipate the occurrence of inclement weather and replace the ordinary tires with the snow or studded tires. Consequently, two sets of tires are required which must either be alternately mounted on one set of vehicle wheels, or a second set of wheels must be obtained. Disadvantages of snow or studded tires include the cost of changing multiple set of wheels and/or tires, and the inability to react to unexpected weather.

Tire chains are commonly installed on the ordinary tires of a vehicle to enable an operator to react to, rather than anticipate, inclement whether. The disadvantages of tire chains include the need to have a set of chains sized to fit the particular tires of a vehicle, and the possibility of a chain being "thrown-off" a rotating wheel damaging the vehicle body. Further, tire chains are generally installed by driving a tire onto the chain and subsequently linking the chain around the circumference of the tire. In the event the vehicle is already stuck, i.e. the tire spins without gaining traction, it is not possible to install the chains which could free the vehicle without elevating the tire off the ground.

U.S. Pat. No. 5,735,980 to Robeson discloses an emergency traction device in which the mechanisms for fitting the device to the diameter and width of the wheel each include a separate winch.

Other types of device intended to be attached to the tires and/or wheels of vehicles for the purpose of improving traction are described in the United States Patents to Laub (U.S. Pat. No. 5,513,684); Metraux (U.S. Pat. No. 5,254,187); Zelent (U.S. Pat. No. 4,974,653); Parker, III (U.S. Pat. No. 4,886,100); McDonough (U.S. Pat. No. 4,862,936); Regensburger (U.S. Pat. No. 4,209,049); Hyggen (U.S. Pat. Nos. 4,122,880 and 3,891,018); Welsh (U.S. Pat. No. 4,098,314); Gomez (U.S. Pat. No. 3,847,196); Clark (U.S. Pat. No. 3,736,970); Scott (U.S. Pat. No. 3,249,143); Bopst III (U.S. Pat. No. 3,053,302); Hayes (U.S. Pat. No. 2,981,303); Binegar (U.S. Pat. No. 2,910,105); Schroen (U.S. Pat. No. 2,640,522); Pindjak (U.S. Pat. No. 2,598,298) and Edwards (U.S. Pat. No. 2,423,759). In general, these patents disclose traction devices having a plurality of arms extending outward toward the tread surface of the tire.

SUMMARY OF THE INVENTION

An object of the present invention is to provide an emergency traction device for attachment to a vehicle tire which is conveniently stored, easily adapted to tires of different diameters and widths, and is uniformly and securely installed.

Another object of the present invention is to provide an emergency traction device which may be readily installed and removed under any circumstances and terrain conditions.

A further object of the present invention is to provide an emergency traction device which is immediately transferable between alternate vehicles having different size tires.

Yet another object of the present invention is to provide an emergency traction device in which a single mechanism is used for fitting the device first to the diameter and then to the width of the wheel.

These objects, as well as additional objects and advantages of the present invention that will be apparent from the following description, are achieved according to a traction device for attachment with respect to a tire rotating on an axis, wherein the tire has a terrain engaging surface connecting a pair of sidewalls. The traction device comprises a plurality of arms adapted to extend radially with respect to the axis, each of the plurality of arms including a first section adapted to be radially extensible with respect the terrain engaging surface and a second section adapted to be extensible across the terrain engaging surface, each of the plurality of second sections being mounted at a radially outward end of a corresponding one of the plurality of first sections; a plurality of fingers adapted to engage one of the pair of sidewalls, each of the plurality of second sections extensibly connecting a corresponding one of the plurality of first sections and a corresponding one of the plurality of fingers; a winch including a cable drum and a plurality of cables, each of the plurality of cables extending from a corresponding one of the plurality of fingers, along corresponding ones of the first and second sections, to the cable drum; a plurality of first springs each expanding a corresponding one of the first sections; and a plurality of second springs each expanding a corresponding one of the second sections. Each of the first springs has a lower spring constant than a corresponding one of the plurality of second springs.

DESCRIPTION OF A PREFERRED EMBODIMENT

Figure 1:
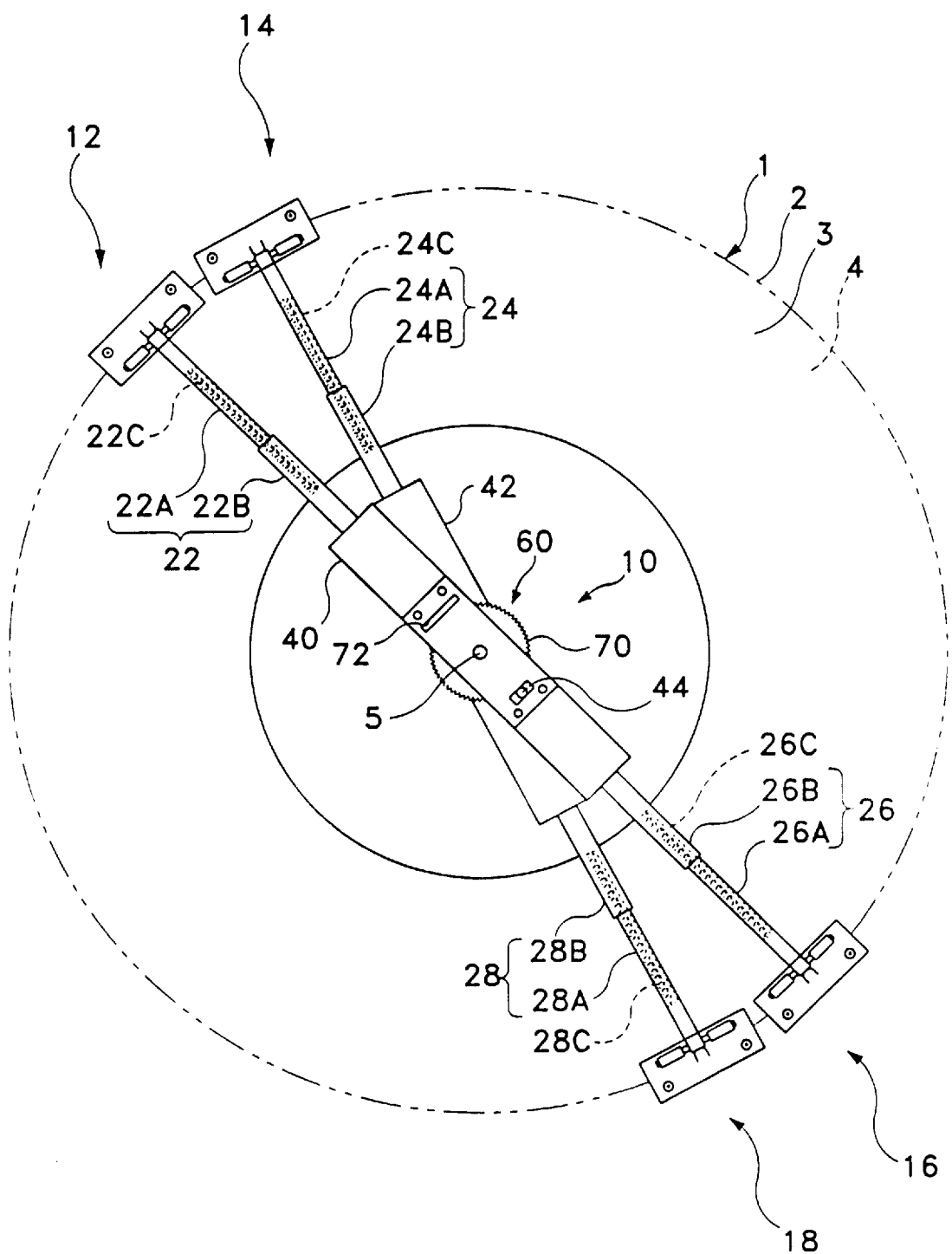
FIG. 1 is a front view of a traction device according to a preferred embodiment of the present invention shown in a collapsed state.
Figure 2:
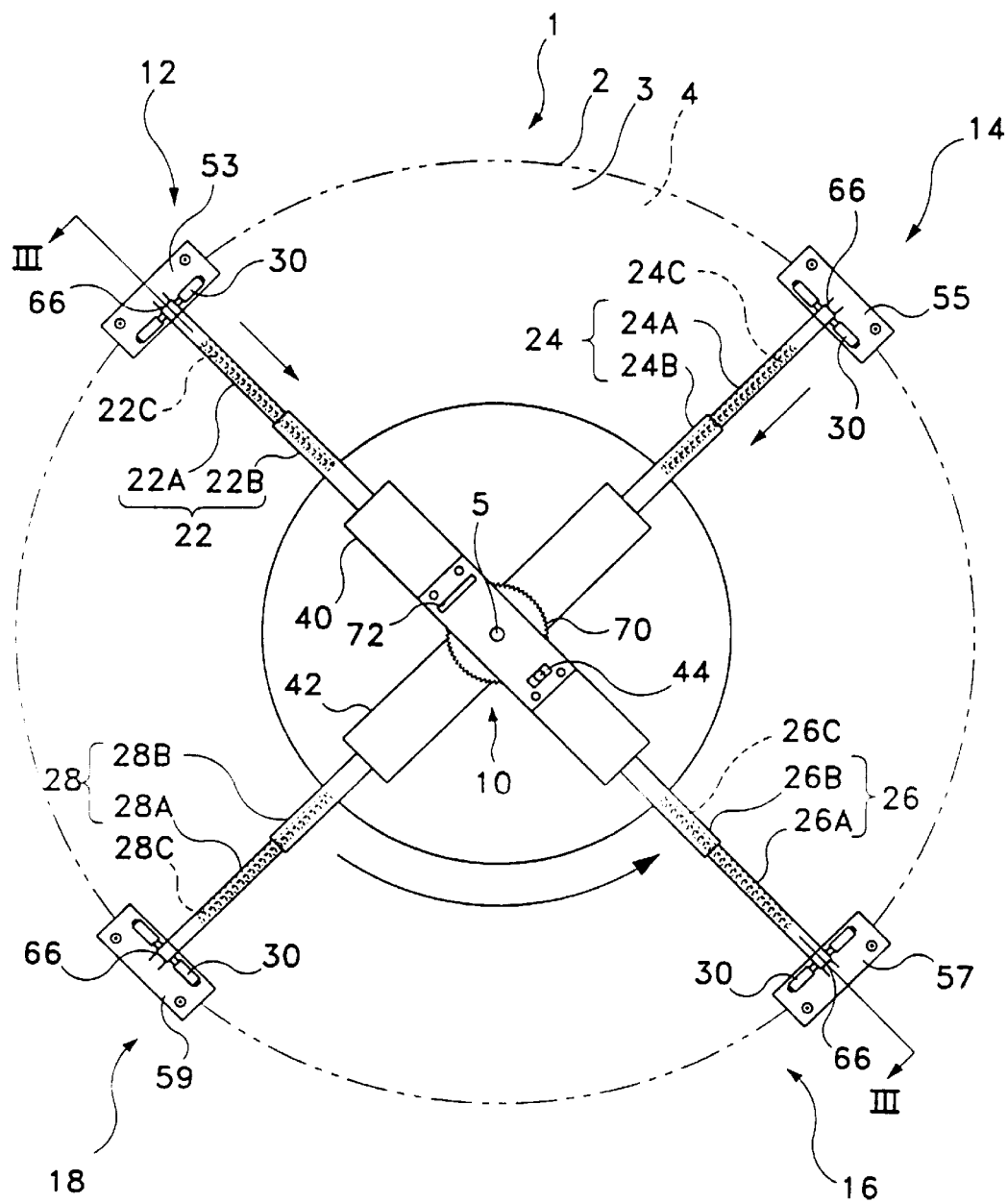
FIG. 2 is a front view of the traction device according to a preferred embodiment of the present invention shown in an installed state.
Figure 3:
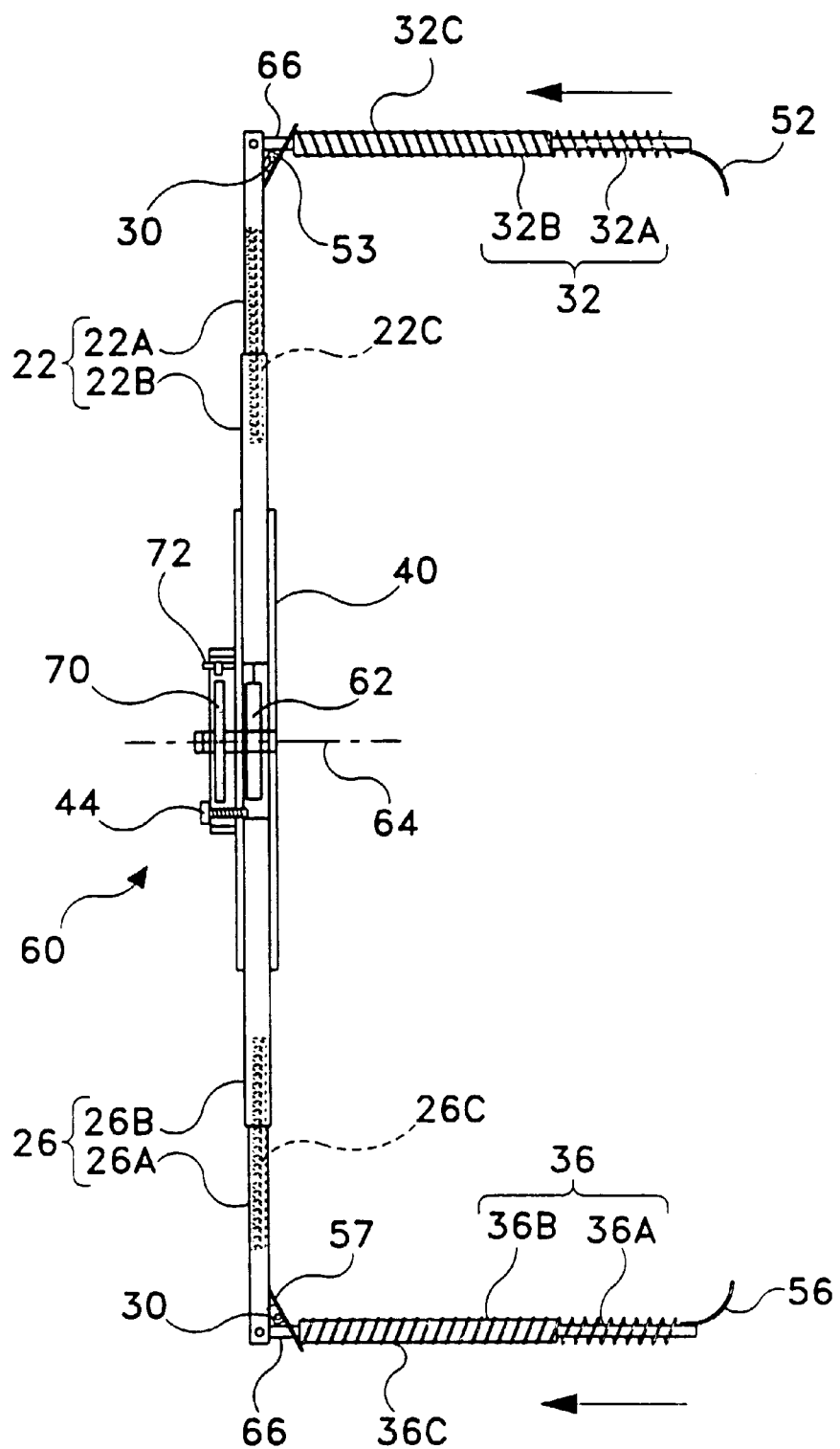
FIG. 3 is a cross-section view taken along line III—III in FIG. 2 of a traction device according to a preferred embodiment of the present invention shown in an installed state.

Referring to FIGS. 1–3, a traction device 10 is shown with respect to a tire 1. Tire 1 includes a terrain engaging tread surface 2 and two sidewalls 3,4 connected by the tread 2 in a known arrangement.

Traction device 10 includes a plurality of arms 12,14,16,18 extending radially outward toward the tread 2. Although four arms are illustrated, it is understood the present invention may include more or less than four arms. However, at least two arms must be present, and at least three arms or an even multiple of arms are preferable.

Each arm 12,14,16,18 includes a corresponding first extensible section 22,24,26,28 such that the traction device can be made to accommodate tires of varying diameters. Each first extensible section 22,24,26,28 includes a corresponding hollow rod 22A,24A,26A,28A that is telescopically slidable within a corresponding tube 22B,24B,26B,28B. Two telescopically related components A,B for each arm 12,14,16,18 are illustrated for the purposes of describing the present invention; however, more than two telescopic components are also possible. Preferably, the telescopic components A,B have cross-sections which prevent relative rotation along the length of the arms 12,14,16,18.

Each first extensible section 22,24,26,28 further includes a corresponding first resilient biasing element 22C,24C,26C, 28C, e.g. a coil spring, causing relative expansion of the telescopic components A,B. According to a preferred embodiment of the present invention, the first resilient biasing elements 22C,24C,26C,28C are enclosed by and extend within the telescopic components A,B of the first extensible sections 22,24,26,28.

According to a preferred embodiment, a first group of the arms 12,16 are fixed at their radially proximal end to a first support plate 40, and a second group of the arms 14,18 are fixed at their radially proximal end to a second support plate 42. First and second support plates 40,42 are relatively pivotal about a central point substantially coincident with the axis of rotation 5 for the tire 1. In the collapsed position of the traction device 10 (FIG. 1), first and second support plates 40,42 are relatively pivoted such that arms 12 and 14, as well as arms 16 and 18, are clustered together. After positioning the traction device 10 with respect to tire 1, the first and second support plates 40,42 are relatively pivoted to equiangularly dispose the arms 12,14,16,18 around the tire rotation axis 5 (FIG. 2). A lock mechanism 44 maintains the relative position of the first and second support plates 40,42.

A corresponding second extensible section 32,34,36,38 is mounted at the radially distal end of each arm 12,14,16,18. According to a preferred embodiment of the present invention, each of the second extensible sections 32,34,36, 38 is mounted with respect to their corresponding first extensible sections 22,24,26,28 by a hinge joint 30 that enables the traction device 10 to be further collapsed for storage. Each second extensible section 32,34,36,38 includes a corresponding finger 52,54,56,58 engaging the inner sidewall 4 of the tire 1. According to a preferred embodiment of the present invention, plates 53,55,57,59 may engage the outer sidewall 3 of the tire 1. Each of the second extensible sections 32,34,36,38 is interposed between corresponding ones of the fingers 52,54,56,58 and either the first extensible sections 22,24,26,28 or the plates 53,55,57,59. According to a preferred embodiment of the present invention, each second extensible section 32,34,36, 38 includes a rod 32A,34A,36A,38A telescopically related to a tube 32B,34B,36B,38B such that each second extensible section 32,34,36,38 accommodates tires of varying widths. Although two telescopic components A,B for each second extensible section 32,34,36,38 are illustrated for the purposes of describing the present invention, more than two telescopic components are also possible.

Each second extensible section 32,34,36,38 further includes a second resilient biasing element 32C,34C,36C, 38C, e.g. a coil spring, causing relative expansion between corresponding ones of the fingers 52,54,56,58 and either the first extensible sections 52,54,56,58 or the plates 53,55,57, 59. According to a preferred embodiment of the present invention, the second resilient biasing elements 32C,34C, 36C,38C surround and extend along the second extensible sections 32,34,36,38 to enhance the relative traction between both the tire 1 and second extensible section 32,34,36,38, as well as between second extensible section 32,34,36,38 and the terrain. Further, second resilient biasing elements 32C,34C,36C,38C are readily replaceable after significant wear.

It is also possible for the second resilient biasing elements 32C,34C,36C,38C to be enclosed by and extend within the telescopic components A,B of the second extensible sections 32,34,36,38. In such a case, chain links or other traction enhancing projections may be provided on the exterior of the telescopic components A,B.

The first resilient biasing elements 22C,24C,26C,28C are selected to have a lower spring constant than the second resilient biasing elements 32C,34C,36C,38C. As it is used here, spring constant is defined as the force per unit of displacement within the elastic range of the resilient biasing elements C.

A winch 60 is supported by the first and/or second support plate 40,42 and includes a cable drum 62 that can be operably turned on a cable drum axis 64 by a crank (not shown). According to a preferred embodiment of the present invention, cable drum axis 64 is coaxial with tire rotation axis 5 in order to improve inertial balance of the traction device 10 as it rotates with the tire 1. According to a preferred embodiment, the crank is removable to minimize the mass of the traction device 10.

The first end of each of a plurality of cables 66 are attached to cable drum 62 and extend radially outward within the telescopic components A,B of the first extensible sections 22,24,26,28. The second end of each of the plurality of cables 66 is secured with respect to a corresponding one of the fingers 52,54,56,58. Rotation of cable drum 62 by the crank causes cables 66 to be wound on cable drum 62, thereby contracting the first extensible sections 22,24,26,28 against the force of the first resilient biasing elements 22C,24C,26C,28C. Rotation of the cable drum 62 further causes contracting of the second extensible sections 32,34, 36,38 of the arms 12,14,16,18 against the force of second resilient biasing elements 32C,34C,36C,38C. As it is used here, cable is defined as any flexible element such as wire, rope, cord, chain, etc.

Inasmuch as the first resilient biasing elements 22C,24C, 26C,28C have a lower spring force than the second resilient biasing elements 32C,34C,36C,38C, the arms 12,14,16,18 are initially contracted along the first extensible sections 22,24,26,28, i.e., radially with respect to the tire tread 2, and are subsequently contracted along the second extensible sections 32,34,36,38, i.e., across the tire tread 2. That is to say, the traction device 10 is initially contracted to the diameter of the tire 1. When the second extensible sections 32,34,36,38 are drawn inward into engagement with the tread 2, radial contraction ceases. Thereafter, the traction device 10 is contracted to the width of the tire 1. When the fingers 52,54,56,58 are drawn into firm engagement with the inner sidewall 4 of the tire 1, width contraction ceases and the traction device 10 is securely held to the tire 1.

Optionally, one or more detents may be used between the components A,B of the second extensible sections 32,34,36, 38 to provide an initial resistance to contraction. Thus, the detents establish a minimum force the cables 66 must exert before the second extensible sections 32,34,36,38 begin contracting. This minimum force would not be exerted until the first extensible sections 22,24,26,28 are fully contracted.

A one-way ratchet mechanism 70 prevents loosening of the traction device 10 until a ratchet release lever 72 enables reverse rotation of the cable drum 62, i.e., to unwind the cables 66 under the influence of the first and second resilient biasing elements C.

In addition to regulating the sequence of contraction, the first and second resilient biasing elements C compensate for deflection of the sidewalls 3,4 as portions of the tire 1 bulge due to contact of the tread 2 with the terrain.

Further modifications envisioned within the scope of the appended claims include: securing the ratchet release lever 72 with a key lock (not shown) to prevent unauthorized release of traction device 10 from the tire 1; including cable stops (not shown) to limit movement of the cables 66 thereby facilitating replacement of the second resilient biasing elements 32C,34C,36C,38C; including a mar resistant material on the sides of the support plates 20,22 confronting the tire 1 to prevent scuffing the wheel; including an anti-friction coating or lubricant at the interfaces between the components A,B of the first and second extensible sections 22,24,26,28,32,34,36,38; including an anti-friction coating or lubricant at the interfaces where the first and second resilient biasing elements C circumferentially touch the first and second extensible sections 22,24,26,28,32,34,36,38; and providing friction enhancing material at the interface between the fingers 52,54,56,58 and/or plates 53,55,57,59 with the sidewalls 3,4 of the tire 1.

The foregoing description with reference to the figures of certain embodiments of the present invention is for illustrative purposes only. Various changes and modifications may be made within the spirit and scope of the appended claims.

What is claimed is:

1. A traction device for attachment with respect to a tire rotating on an axis, the tire having a terrain engaging surface connecting a pair of sidewalls, said traction device comprising:

a plurality of arms adapted to extend radially with respect to the axis, each of said plurality of arms including a first section adapted to be radially extensible with respect to the terrain engaging surface and a second section adapted to be extensible across the terrain engaging surface, each of said plurality of second sections being mounted at a radially outward end of a corresponding one of said plurality of first sections;

a plurality of fingers adapted to engage one of the pair of sidewalls, each of said plurality of second sections extensibly connecting a corresponding one of said plurality of first sections and a corresponding one of said plurality of fingers;

a winch including a cable drum and a plurality of cables, each of said plurality of cables extending from a corresponding one of said plurality of fingers, along corresponding ones of said first and second sections, to said cable drum;

a plurality of first springs each expanding a corresponding one of said first sections; and a plurality of second springs each expanding a corresponding one of said second sections;

wherein each of said first springs has a lower spring constant than a corresponding one of said plurality of second springs.

2. Said traction device according to claim 1, further comprising:

a hinge joint mounting each of said plurality of second sections at said radially outward end of said corresponding one of said plurality of first sections.

3. Said traction device according to claim 1, further comprising:

a plurality of anti-friction devices redirecting a corresponding one of said plurality of cables between said corresponding ones of said first and second sections.

4. Said traction device according to claim 3, wherein each of said plurality of anti-friction devices includes a roller.

5. Said traction device according to claim 3, wherein each of said plurality of anti-friction devices includes a sliding block.

6. Said traction device according to claim 5, wherein each of said sliding blocks is made of TEFLON.

7. Said traction device according to claim 5, wherein each of said sliding blocks is made of NYLON.

8. Said traction device according to claim 1, further comprising:

a first support plate fixed to at least a first one and a second one of said plurality of arms;

a second support plate fixed to at least a third one of said plurality of arms, said first support plate and said second support plate being pivotal with respect to one another; and, a lock for securing said first support plate with respect to said second support plate in a pivotal position wherein said plurality of arms are adapted to be equiangularly disposed around the axis.

9. Said traction device according to claim 1, wherein each said plurality of first sections includes a relatively telescopic first rod and first tube.

10. Said traction device according to claim 9, wherein each of said plurality of cables extend within corresponding ones of said relatively telescopic first rod and first tube.

11. Said traction device according to claim 9, wherein each of said plurality of first springs extend within corresponding ones of said relatively telescopic first rod and first tube.

12. Said traction device according to claim 9, wherein corresponding ones of said first rods and first tubes have complimentary cross-sections that prevent relative rotation.

13. Said traction device according to claim 1, wherein each said plurality of second sections includes a relatively telescopic second rod and second tube.

14. Said traction device according to claim 13, wherein each of said plurality of cables extend within corresponding ones of said relatively telescopic second rod and second tube.

15. Said traction device according to claim 13, wherein each of said plurality of second springs extend around corresponding ones of said relatively telescopic second rod and second tube.

16. Said traction device according to claim 13, wherein each of said plurality of second springs extend within corresponding ones of said relatively telescopic second rod and second tube.

17. Said traction device according to claim 13, wherein said second rod and said second tube have cross-sections that prevent relative rotation.

18. Said traction device according to claim 13, further comprising:

a plurality of detents establishing a minimum force for contracting said second sections, each of said plurality of detents is interposed between corresponding ones of said relatively telescopic second rods and second tubes.

19. Said traction device according to claim 1, wherein interfaces between said pluralities of extensible sections and said pluralities of springs have an anti-friction coating.

20. Said traction device according to claim 1, wherein said winch includes a one-way ratchet and a ratchet release lever.

* * * * *